(12) United States Patent
Szeto et al.

(10) Patent No.: US 6,839,018 B2
(45) Date of Patent: Jan. 4, 2005

(54) VERTICAL PROFILE DISPLAY WITH ARBITRARY PLANE

(75) Inventors: Roland Y. Szeto, Seattle, WA (US); Bill G. Cornell, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 10/080,180

(22) Filed: Feb. 19, 2002

(65) Prior Publication Data

US 2003/0006928 A1 Jan. 9, 2003

Related U.S. Application Data

(60) Provisional application No. 60/302,826, filed on Jul. 3, 2001, and provisional application No. 60/305,443, filed on Jul. 13, 2001.

(51) Int. Cl.⁷ .............................................. G01S 13/95
(52) U.S. Cl. ........................ 342/26; 342/179; 342/180; 342/181; 342/182
(58) Field of Search ............................ 342/26, 85, 176, 342/179, 180, 181, 182, 195, 197

(56) References Cited

U.S. PATENT DOCUMENTS

| | | | | |
|---|---|---|---|---|
| 4,127,873 A | | 11/1978 | Katagi | 358/166 |
| 5,059,967 A | | 10/1991 | Roos | 342/26 |
| 5,198,819 A | | 3/1993 | Susnjara | 342/26 |
| 5,202,690 A | | 4/1993 | Frederick | 342/26 |
| 5,781,146 A | | 7/1998 | Frederick | 342/26 |
| 5,920,276 A | * | 7/1999 | Frederick | 342/26 |
| 6,501,392 B2 | * | 12/2002 | Gremmert et al. | 340/971 |
| 2003/0001770 A1 | * | 1/2003 | Cornell et al. | 342/26 |
| 2003/0016155 A1 | * | 1/2003 | Szeto et al. | 342/26 |
| 2003/0016156 A1 | * | 1/2003 | Szeto et al. | 342/26 |

OTHER PUBLICATIONS

"Integrated methods of diagnosing and forecasting aviation weather", Linndholm, T.A; Digital Avionics Systems Conferences, 2000. Proceedings. DASC. The 19th, Vol.: 1, pp.: 3D2/1–3D2/8 vol. 1.*

"Modern aviation weather systems for efficient flight management", Mahapatra, P.R.; Zrnic, D.S.; Position Location and Navigation Symposium, 1990. Record. 'The 1990's—A Decade ofExcellence in the Navigation Sciences'. IEEE PLANS '90.,Ma 1990 pp. 457–463.*

"A three millimeter airborne radar for high resolution polarimetric cloud measurements", Pazmany, A.L et al; Geoscience and Remote Sensing Symposium, 1993. IGARSS '93. 'Better Understandingof Earth Environment'., International , Aug. 18–21 1993 pp. 326–328.*

"Sensors and systems to enhance aviation safety against weather hazards", Mahapatra, P.R.; Zrnic, D.S.; Proceedings of the IEEE, vol.; 79 Issue: Sep. 9, 1991 pp.: 1234–1267.*

* cited by examiner

Primary Examiner—John B. Sotomayor
(74) Attorney, Agent, or Firm—Honeywell International Inc.

(57) ABSTRACT

A system for allowing pilots to quickly determine weather hazard-free flight paths and weather hazards that exist along the aircraft flight plan. The system includes a memory, a processor, and a display device. The memory stores weather radar return information in a three-dimensional buffer. The processor is coupled to the memory. The processor receives a display distance value signal, retrieves weather radar return information stored in a plane of voxels in the three-dimensional buffer based on the selected display distance value and aircraft position information, and generates an image based on the retrieved weather radar return information. The display device is coupled to the processor for displaying the generated image.

15 Claims, 6 Drawing Sheets

US 6,839,018 B2

VERTICAL PROFILE DISPLAY WITH ARBITRARY PLANE

COPENDING APPLICATIONS

This application claims priority from now abandoned U.S. Provisional Patent Application No. 60/302,826 filed on Jul. 3, 2001, and from now abandoned U.S. Provisional Patent Application No. 60/305,443 filed on Jul. 13, 2001.

This invention relates to copending applications U.S. patent application No. 10/080,197, U.S. patent application No. 10/079,477, and U.S. patent application No. 10/080,192 all filed on Feb. 19, 2002.

BACKGROUND OF THE INVENTION

Traditional radar systems display data is limited to a line of sight starting from the aircraft-mounted radar antenna. This is, in general, not where the aircraft is going to be flying, particularly throughout the course of a flight. Deviations in heading and altitude are common during a typical flight. With existing systems, the burden is placed on the pilot to manually adjust the weather radar to obtain returns from where the aircraft will eventually fly. When more burdens or tasks are required by a pilot to complete, the chance of an error occurring increases. Therefore, there exists a need to reduce pilot tasks—automate the weather radar display—in order to provide a safer flying environment.

SUMMARY OF THE INVENTION

The present invention comprises a system for allowing pilots to quickly determine weather hazard-free flight paths and weather hazards that exist along the aircraft flight plan. The system includes a memory, a processor, and a display device. The memory stores weather radar return information in a three-dimensional buffer. The processor is coupled to the memory. The processor receives a display distance value signal, retrieves weather radar return information stored in a plane of voxels in the three-dimensional buffer based on the selected display distance value and aircraft position information, and generates an image based on the retrieved weather radar return information. The display device is coupled to the processor for displaying the generated image.

In accordance with further aspects of the invention, the system includes a user interface device coupled to the processor for generating the display distance value signal.

In accordance with other aspects of the invention, the system retrieves weather radar return information stored in a three-dimensional buffer based on a flight plan.

As will be readily appreciated from the foregoing summary, the invention provides a system for reducing pilot tasks when viewing weather radar return data.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
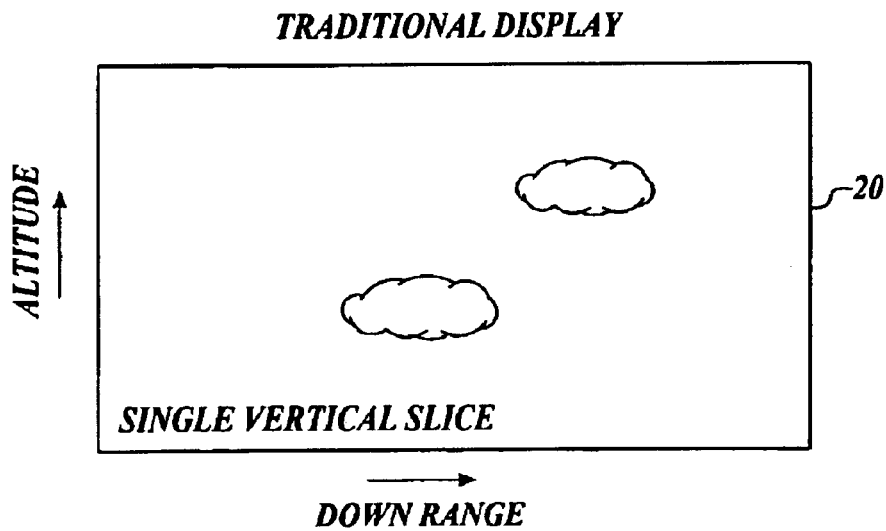
FIGS. 1 and 2 are example prior art weather radar display views.
Figure 2:
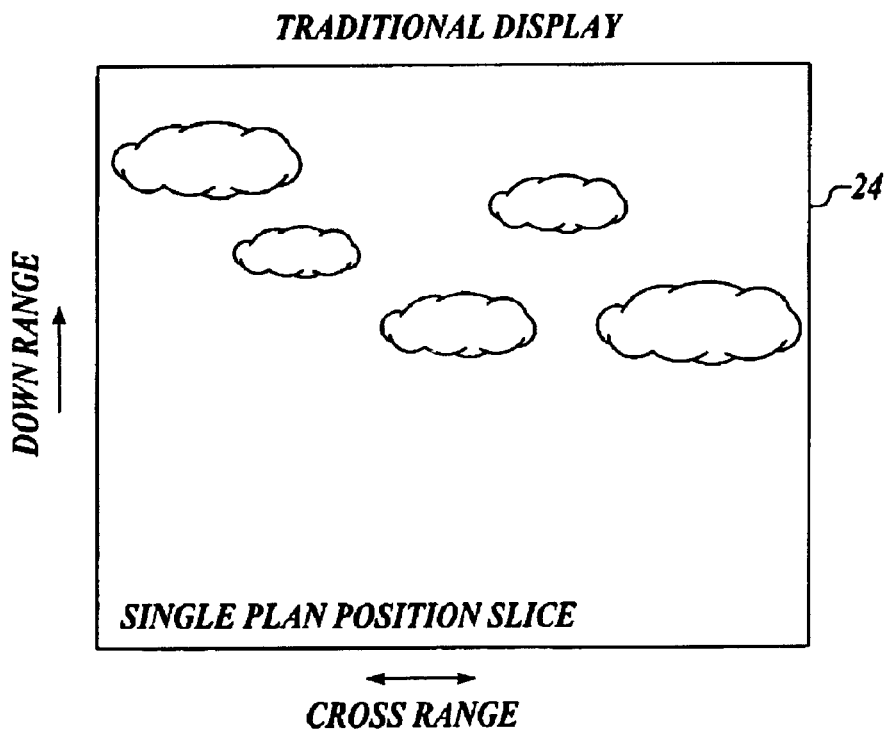

The present invention provides weather radar displays that allow pilots to quickly determine weather hazard-free flight paths and weather hazards that exist along the aircraft flight plan. FIGS. 1 and 2 illustrate prior art weather radar displays. FIG. 1 illustrates a single vertical slice image 20 of weather radar return information within a range of altitudes extending down range from an aircraft. The image 20 allows the pilot to determine if any weather radar return information (hazard information) exists in a vertical plane along the aircraft heading. The image 20 does not present any hazards that are in close proximity to the aircraft yet not along the vertical plane of the image 20. In order for the pilot to view hazards not in the vertical slice image 20, the pilot must select a plan position image 24 shown in FIG. 2. An additional viewing method is to sweep a vertical slice through azimuth. This is time consuming and requires more complicated processing. The plan position image 24 presents weather hazards that exist along a particular radar sweep. Because the image 24 includes radar return information from a radar sweep that is typically a scan of the sky at some tilt angle from the aircraft, the pilot cannot readily determine the altitude of any presented weather hazards unless the weather hazards are very close to the aircraft. All that the pilot can determine is the radial direction and distance of the hazard from the airplane. The present invention provides a single image that allows the pilot to quickly and easily determine a hazard's distance, altitude, and azimuth from the aircraft.

Figure 3:
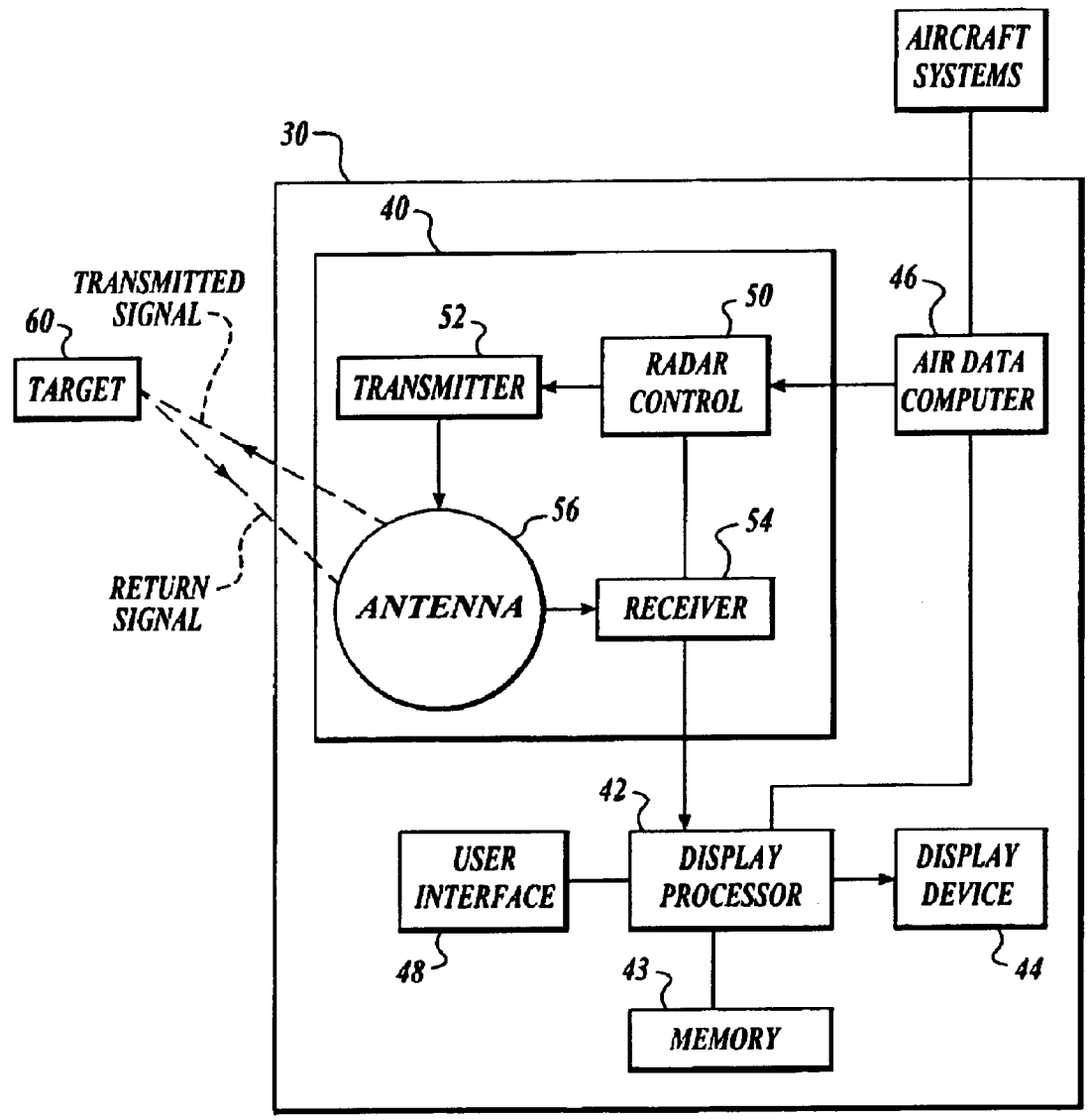
FIG. 3 is a block diagram of an example system for performing the present invention.

FIG. 3 illustrates an example system 30 formed in accordance with the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43. An example of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or Global Positioning System (GPS). The air data computer 46 generates air data based on signals received from various aircraft flight systems. The radar system 40 transmits radar signals from the antenna 56 into space and receives return signals (reflectivity values) if a target 60 is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings within the processor 42.

The translated return signals (return data), as determined by the radar system 40 or processor 42, identify certain weather targets, such as rain/moisture, windshear, or turbulence. The type of weather target identified is based on a corresponding present algorithmic interpretation of the reflectivity values. The pilot selects the type of weather identified using the user interface 48.

Figure 4A:
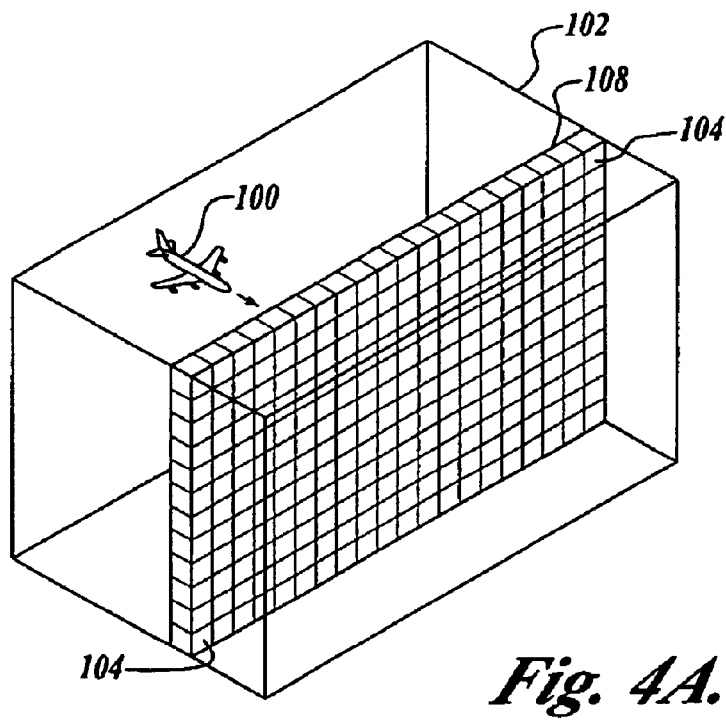
FIGS. 4A and B are perspective views of a three-dimensional buffer generated by the system shown in FIG. 3.
Figure 4B:
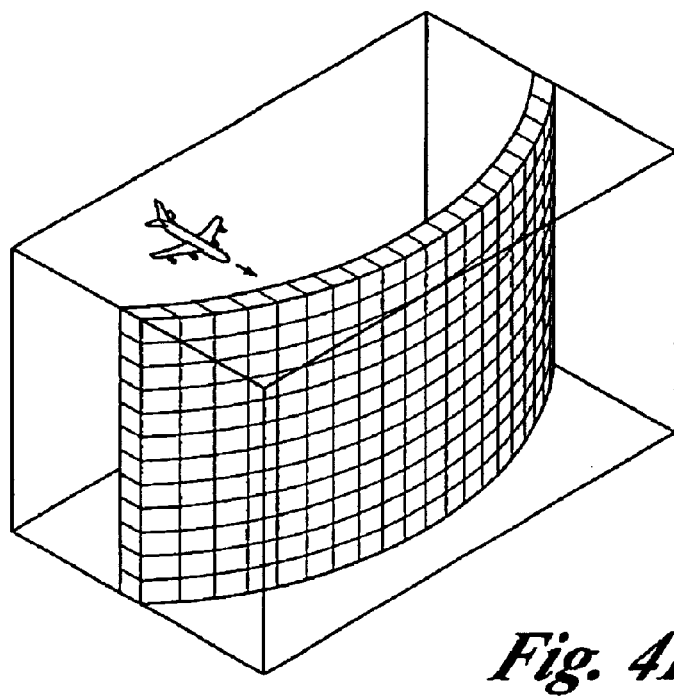

FIG. 4A illustrates a perspective view of a three-dimensional weather radar return buffer 102 as generated by the system illustrated in FIG. 3. The three-dimensional buffer 102 includes a plurality of voxels that store various information received from the radar system 40 and processed by the processor 42. The process of filling the voxels is described in more detail in U.S. patent application Ser. No. 10/080,197, applicant docket no. H0002692, filed Feb. 19, 2002, which is hereby incorporated by reference. U.S. Pat. No. 5,059,967 to Roos describes an apparatus and method for displaying weather information and is also hereby incorporated by reference. In one embodiment of the present invention, the processor 42 retrieves the radar return information stored in each voxel 104 in a voxel plane 108 that is perpendicular to the present heading of an airplane 100. The voxel plane 108 chosen is determined by a user defined distance value or preset distance value from the airplane's current location as received from a navigation system or air data computer 46. The processor 42 generates an image according to the retrieved information from the voxels 104 in the voxel plane 108 and presents the image on the display device 44. The width and height dimensions of the voxel plane 108 are preset or determined by a user. The width dimension is preferably set according to display dimensions (image width on the display device 44). The height dimension is set according to display dimensions or is selected by the pilot using the user interface 48. In an alternate embodiment, the voxel plane associated with the retrieved weather return information is at a constant range from the aircraft, i.e. a windshield view, see FIG. 4B.

Figure 5:
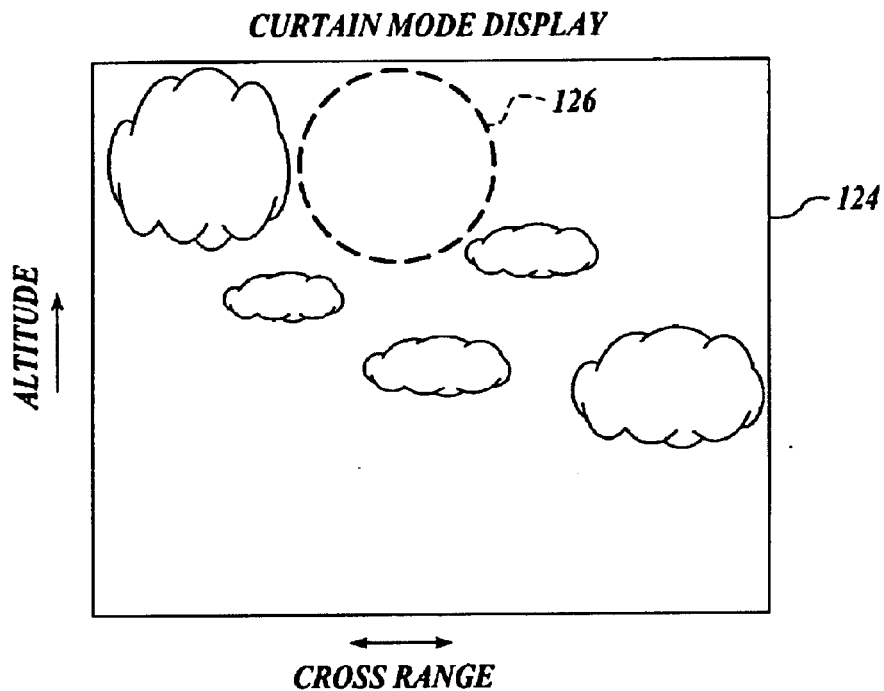
FIG. 5 is a weather radar display generated by using the three-dimensional buffer shown in FIG. 4.

FIG. 5 illustrates an example image 124 of information retrieved from a plane of voxels, similar to voxel plane 108. The image 124 presents all weather hazard information at a particular distance from the airplane 100. In this example, the center of image 124 is associated with the aircraft's position relative to the weather hazards retrieved from the corresponding voxel plane. A pilot easily identifies an area of safe travel 126 that is free of hazards. Other display orientations are possible without departing from the spirit and scope of the present invention.

Figure 6:
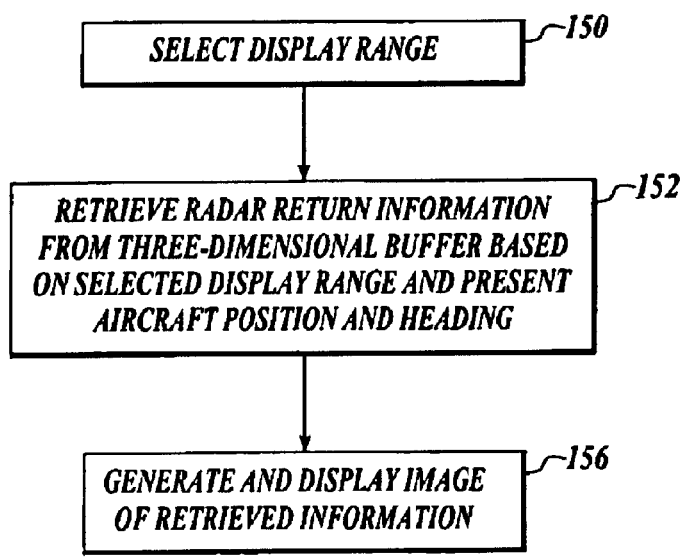
FIG. 6 is a flow diagram for generating the display shown in FIG. 5 and for generating a display according to intended flight path.

FIG. 6 illustrates an example process for generating the radar display image 124 shown in FIG. 5. First, at block 150, a display range is selected. Selection of the display range is performed by the flight crew using the user interface 48 or is a previously set value programmed into the user interface 48, processor 42, or memory 43. Next, at block 152, the processor 42 retrieves radar return information from the three-dimensional buffer based on the selected display range and present aircraft position and heading information. At block 156, the processor 42 generates an image according to the retrieved information. Then, the generated image is displayed on the display device 44.

FIGS. 7-12 illustrate an alternate embodiment of the present invention. The alternate embodiment provides generating an image of weather hazards along a flight plan.

Figure 7:
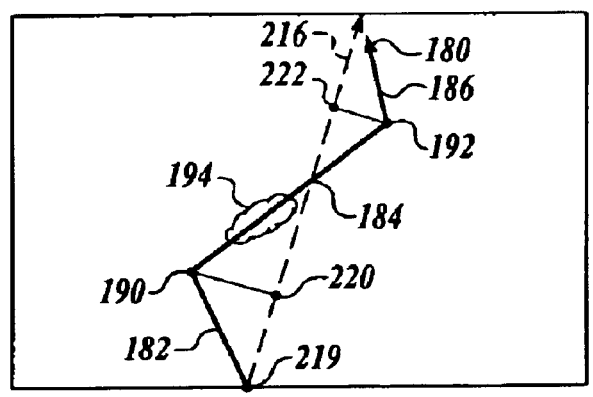
FIG. 7 shows a plan view of an example airplane's heading changes according to a flight plan.
Figure 8:
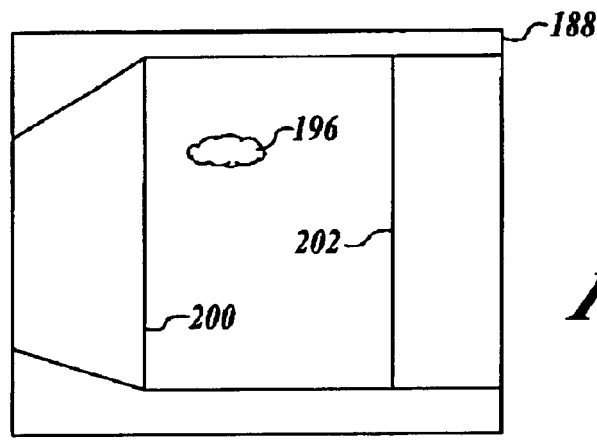
FIGS. 8 and 9 are vertical profile views of stored three-dimensional weather (radar return) information retrieved according to the flight plan shown in FIG. 7.

FIG. 7 is a top view of an aircraft's flight plan's directional profile 180 through any existing weather patterns. Like most flight plans, the flight plan profile 180 includes a number of segments 182, 184, 186 connected by waypoints 190, 192. The aircraft's current position is identified by a point 219 preferably located at the beginning of the profile 180, but could be anywhere along the flight plan profile. The flight plan profile 180 is stored in or created by a flight management system (FMS) or some other similar navigational system. In this embodiment, the processor 42 generates vertical profile display images 188, 218 (shown in FIGS. 8 and 9) based on the flight plan profile 180. At sample points along each of the flight plan profile segments 182–186, the processor extracts radar return information stored in voxels in the three-dimensional buffer at the corresponding xy location in the buffer between a set display altitude range. The display altitude range can be selected by the pilot or can be preset by the processor 42 based on display parameters or some other value. The result becomes a side view of the information within a range of altitudes along each segment. FIG. 8 illustrates the result as described above for the flight plan profile 180 shown in FIG. 7. As shown in FIG. 7, near the beginning of segment 184 after waypoint 190, the flight plan profile 180 passes through a weather hazard 194. As shown in FIG. 8, the radar system 40 has scanned the weather hazard 194 sending the radar return information to the processor 42 for storage in the three-dimensional buffer. The processor 42 retrieves the information from the three-dimensional buffer that corresponds to the horizontal positions on each of the segments 182–186 and presents that information accordingly. The processor 42 retrieves from the three-dimensional buffer weather hazard information that corresponds to the existing weather hazard 194. Then, the processor 42 generates a weather hazard 196 and displays the hazard 196 in a location in image 188 according to the stored location in the buffer. The weather hazard 196 is shown on the generated vertical profile image 188 after a vertical line segment 200 that corresponds to the waypoint 190. Also shown in the vertical profile image 188 is a vertical line 202 that corresponds to the waypoint 192 from the flight plan profile 180. The distances between the vertical lines and edges of the display of the vertical profile image 188 are proportional to the length of each of the corresponding segments of the flight plan profile 180. In this example, in FIGS. 8 and 9 the center of the left edge of the images 188, 218 or display identifies the aircraft's current position.

Figure 9:
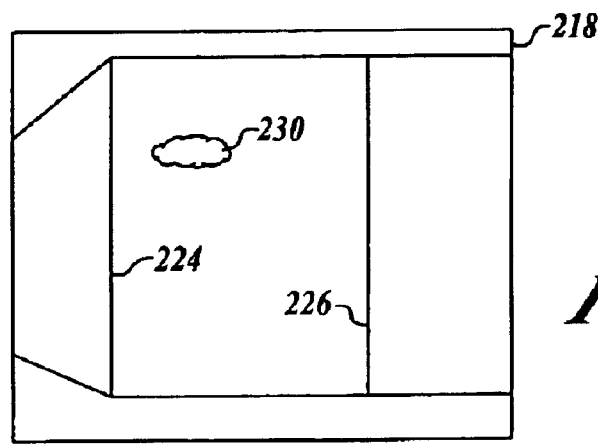

FIG. 9 illustrates an alternate embodiment of a vertical profile image 218 corresponding to the flight plan profile 180 shown in FIG. 7. The vertical profile image 218 is proportional to a line 216 emanating from the aircrafts present location (point 219) as shown in FIG. 7. All of the information retrieved from the three-dimensional buffer and displayed in image 218 corresponds to each of the line segments 182, 184, 186 of the profile 180, but are compressed onto shorter corresponding segments on line 216. The processor 42 compresses the information retrieved from the buffer for each of the segments 182, 184, 186 into a reduced area of the image 218 as compared to that in the image 188 shown in FIG. 8. As shown in FIG. 9, a first vertical line segment 224 corresponds to point 220, which is a projection of waypoint 190 onto line 216. Also, a second vertical line segment 226 corresponds to point 222, which is a projection of waypoint 192 onto line 216. Thus, the image 218 is a compressed view of the radar return information stored in a range of altitudes along the aircrafts flight plan profile 180. A displayed weather hazard 230 shown after line segment 224 is a compressed projection of the weather pattern 194 retrieved from the three-dimensional buffer.

Figure 10:
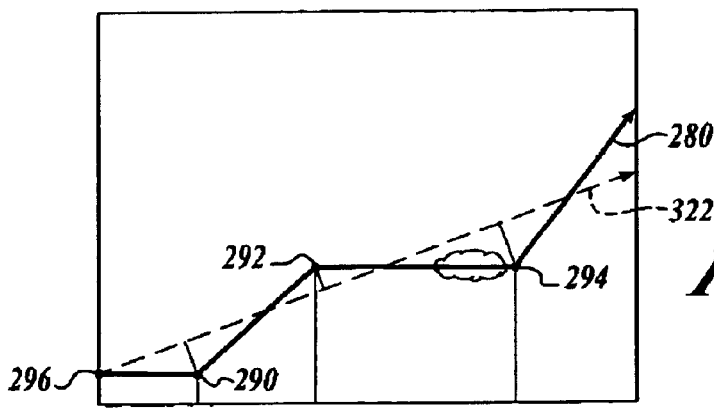
FIG. 10 is a vertical profile view of an example airplane's altitude changes according to a flight plan.
Figure 11:
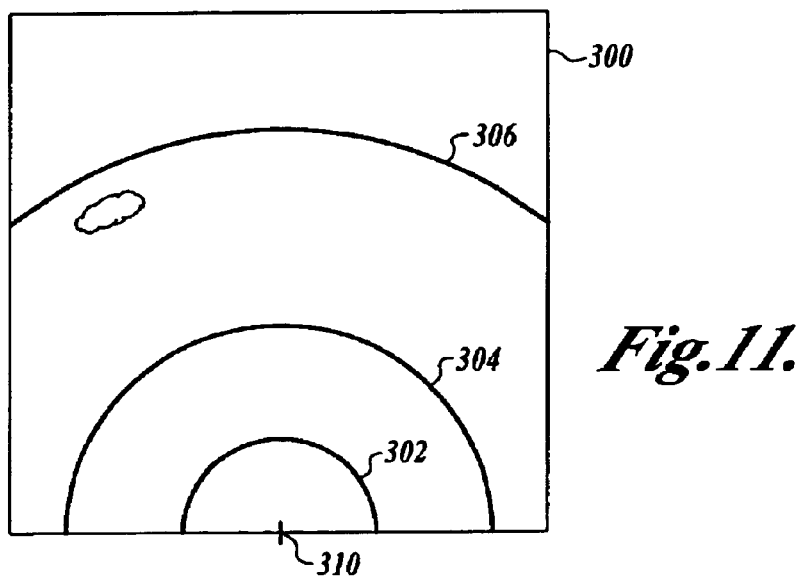
FIGS. 11 and 12 are plan views of stored three-dimensional weather information retrieved according to the flight plan shown in FIG. 10.

FIG. 10 illustrates an example of an aircraft's vertical flight profile 280 with the aircraft's current position 296 shown as the beginning of the profile 280. The flight profile 280, like profile 180, is generated by the FMS or similar navigational system. In this embodiment, plan position views are generated using the vertical flight path profile and the aircraft's current position. For each segment of the vertical flight path profile 280 between change in altitude points 290, 292, 294, the processor 42 extracts radar return information stored in the three-dimensional buffer that corresponds to the plane of each segment. For example, the line segment between points 292 and 294 of the vertical profile 280 indicates a constant altitude period of time on the flight profile 280. Therefore, the processor 42 extracts all the radar return information corresponding to the constant altitude of the line segment between points 292 and 294. As shown in FIG. 11, the processor 42 presents the extracted information as an image 300 on the display 44 between an upper and lower radius value from a current aircraft position indicator 310. The image 300 includes curve lines 302, 304, 306 that are at some radius distance from an aircraft position indicator 310 that is proportional to the distances of each of the line segments between the points 290, 292, 294. For example, the radar return information stored in the buffer that corresponds to the line segment between points 292 and 294 is displayed within corresponding lines 304 and 306 in image 300.

Figure 12:
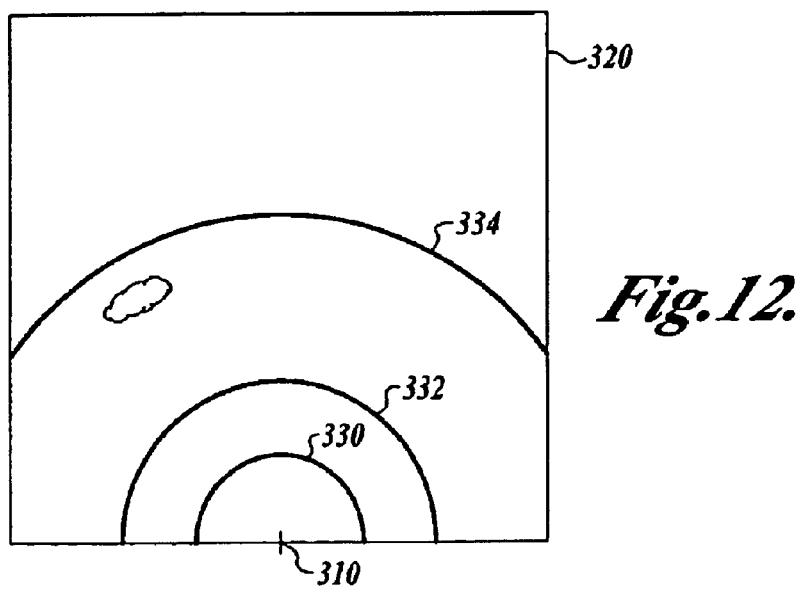

FIG. 12 illustrates a compressed plan position image 320 of the vertical profile 280. Referring back to FIG. 10, a vertical flight path line 322 emanating from the current aircraft location 296 is projected to some predetermined point preferably along the aircraft's vertical profile 280. The displayed image 320 includes circular line segments 330, 332, 334 displayed at some radial distance from aircraft position indicator 310. The radial distance between the line segments 330, 332, 334 is proportional to projections of points 290, 292, 294 onto the flight path line 322. As such, all the information extracted from the buffer that corresponds to each line segment is compressed into a smaller radius range as shown in image 320. It is compressed because the corresponding segments along line 322 are shorter than their associated line segments from profile 280.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. An aircraft weather radar display method comprising:
    selecting a display distance value;
    retrieving weather radar return information stored in a plane of voxels in a buffer based on the selected display distance value and aircraft position information; and
    generating an image based on the retrieved weather radar return information.

2. The method of claim 1, wherein the voxel plane associated with the retrieved weather return information is perpendicular to the aircraft's heading.

3. The method of claim 1, wherein the voxel plane associated with the retrieved weather return information is at a constant range from the aircraft.

4. The method of claim 1, further comprising
    selecting a display altitude range,
    wherein retrieving radar return information is further based on the selected display altitude range.

5. The method of claim 1, wherein at least one of the selecting the display distance value or the display altitude range is performed by a user using a user interface device in the aircraft.

6. An aircraft weather radar display system comprising:
    a memory configured to store weather radar return information in a buffer;
    a processor coupled to the memory, the processor comprising:
        a first component configured to receive a display distance value signal;
        a second component configured to retrieve weather radar return information stored in a plane of voxels in the buffer based on the selected display distance value and aircraft position information; and
        a third component configured to generate an image based on the retrieved weather radar return information; and
    a display device configured to display the generated image.

7. The system of claim 6, wherein the voxel plane associated with the retrieved weather radar return information is perpendicular to the aircraft's heading.

8. The system of claim 6, wherein the voxel plane associated with the retrieved weather radar return information is at a constant range from the aircraft.

9. The system of claim 6, further comprising a user interface device coupled to the processor and configured to generate a display altitude range signal, wherein the second component retrieves radar return information further based on the selected display altitude range.

10. The system of claim 6, further comprising a user interface device coupled to the processor and configured to generate the display distance value signal.

11. An aircraft weather radar display computer program product comprising:
    a first component configured to store weather radar return information in a buffer;
    a second component configured to receive a display distance value signal;
    a third component configured to retrieve weather radar return information stored in a plane of voxels in the buffer based on the selected display distance value and aircraft position information; and
    a fourth component configured to generate an image based on the retrieved weather radar return information.

12. The product of claim 11, wherein the voxel plane associated with the retrieved weather radar return information is perpendicular to the aircraft's heading.

13. The product of claim 11, wherein the voxel plane associated with the retrieved weather radar return information is at a constant range from the aircraft.

14. The product of claim 11, further comprising a fifth component configured to generate a display altitude range signal, wherein the second component retrieves radar return information further based on the selected display altitude range.

15. The product of claim 11, further comprising a fifth component configured to generate the display distance value signal.

* * * * *